United States Patent [19]

Milliken

[11] Patent Number: 5,340,235
[45] Date of Patent: Aug. 23, 1994

[54] PROCESS FOR MAKING CEMENTITIOUS MINE BACKFILL IN A SALT ENVIRONMENT USING SOLID WASTE MATERIALS

[75] Inventor: Larry D. Milliken, Factoryville, Pa.

[73] Assignee: Akzo Nobel, Inc., Netherlands

[21] Appl. No.: 923,038

[22] Filed: Jul. 31, 1992

[51] Int. Cl.$^5$ .................................. C04B 7/02
[52] U.S. Cl. ........................... 405/128; 106/710; 106/791; 588/257
[58] Field of Search .............. 405/128, 129, 267; 588/256, 257; 106/710, 751, 791, 900; 110/344

[56] References Cited

U.S. PATENT DOCUMENTS

| | | |
|---|---|---|
| 3,665,716 | 5/1972 | Rogers et al. . |
| 3,971,717 | 7/1976 | Hild et al. ................. 210/59 |
| 4,058,500 | 11/1977 | Vroom ..................... 260/42.24 |
| 4,101,332 | 7/1978 | Nicholson . |
| 4,136,998 | 1/1979 | Bassier et al. ............ 405/267 |
| 4,229,295 | 10/1980 | Krofchak ................... 210/723 |
| 4,293,438 | 10/1981 | Ledebrink et al. ......... 252/301.1 W |
| 4,293,463 | 10/1981 | Vroom ..................... 260/42.24 |
| 4,328,037 | 5/1982 | Demirel et al. . |
| 4,374,672 | 2/1983 | Funston et al. . |
| 4,435,290 | 3/1984 | Lindorfer et al. ......... 210/708 |
| 4,466,833 | 8/1984 | Spangle .................... 106/602 |
| 4,514,307 | 4/1985 | Chestnut et al. .......... 210/751 |
| 4,576,513 | 3/1986 | Lindorfer et al. ......... 405/128 |
| 4,577,999 | 3/1986 | Lindorfer et al. ......... 405/53 |
| 4,613,374 | 9/1986 | Smith . |
| 4,615,809 | 10/1986 | King ........................ 210/751 |
| 4,681,634 | 7/1987 | Roca et al. ................ 524/5 |
| 4,692,061 | 9/1987 | Lindorfer et al. ......... 405/128 |
| 4,731,120 | 3/1988 | Tuuti . |
| 4,880,468 | 11/1989 | Bowlin et al. ............. 106/706 |
| 4,886,393 | 12/1989 | Jahn-Held et al. ......... 405/128 |
| 4,917,733 | 4/1990 | Hansen . |
| 5,058,679 | 10/1991 | Hale et al. ................ 166/293 |

OTHER PUBLICATIONS

"Fourth Symposium on Salt", *The Northern Ohio Geological Society, Inc.*, vol. 2, No. 3568.

*Primary Examiner*—Randolph A. Reese
*Assistant Examiner*—John Ricci
*Attorney, Agent, or Firm*—Ralph J. Mancini; Louis A. Morris

[57] ABSTRACT

The present invention generally relates to a method for hydraulically backfilling empty mined salt cavities. The method comprises combining at least one pozzolanically active waste material with an effective amount of an alkaline earth metal in the form of an alkaline earth metal hydroxide or alkaline earth metal oxide and saturated brine to form a pozzolanic mixture, wherein the relative proportions of said pozzolanically active waste material, alkaline earth metal hydroxide or alkaline earth metal oxide and saturated brine are sufficient for reaction under atmospheric conditions in said salt cavity to form a stable, low porosity, load bearing pozzolanic cement; and hydraulically depositing said pozzolanic mixture in the empty salt cavity.

18 Claims, No Drawings

PROCESS FOR MAKING CEMENTITIOUS MINE BACKFILL IN A SALT ENVIRONMENT USING SOLID WASTE MATERIALS

FIELD OF THE INVENTION

The present invention generally relates to a method of backfilling empty mined salt cavities with a stabilized salt/ash cementitious slurry that hardens to a moderate strength cement, providing structural support to the mine.

BACKGROUND OF THE INVENTION

Solid waste has become a global problem that faces every major industrial nation, including the United States. The municipal and industrial solid waste stream is still largely disposed of in surface landfills that are rapidly diminishing in both volume and number, while the waste stream continues to grow. New incinerators and landfills are equally unpopular whenever they are proposed and ambitious recycling goals, particularly in large metropolitan areas, are not being reached. The crisis, projected for some time to be upon us by the mid-1990's, continues to approach and adequate solutions have yet to materialize.

Various methods are known for the stabilization and storage of solid waste materials. For example, U.S. Pat. No. 4,374,672 discloses a method of producing a stabilized fill material in water which comprises mixing cement (1–6% by weight) fly ash (45–80% by weight) and water (20–50% by weight) and placing said fill material produced directly in water while it is still in a flowable state.

U.S. Pat. No. 4,514,307 discloses a method for disposing of physically unstable, water containing, non-biologic organic waste material. The method comprises combining said waste material with cementitious reactants in the presence of water to form an environmentally acceptable, impermeable, load bearing material.

U.S. Pat. No. 4,576,513 describes a process for the terminal storage of pumpable wastes in salt caverns. The process comprises pumping a water-containing pumpable waste containing a liquid phase into a salt cavern and increasing the specific gravity of said liquid phase with a material selected from soluble salts which crystallize at cavern temperatures, organic materials which solidify at cavern temperature in the liquid phase of the pumpable waste or increase the specific gravity thereof, and adsorbents. The effect is to minimize the convergence of the salt cavern by narrowing the difference between the specific gravity of the salt cavern walls and the specific gravity of the liquid phase of the pumpable waste.

U.S. Pat. No. 4,577,999 discloses a process for storing liquid waste in salt cavities. In the process, the liquid waste with a pH of 7.0 or more is blended with additional materials to produce a pumpable mixture which has a boiling point above 85° C. a flash point above 65° C., vapor pressure at 60° C. of up to 0.5kp/cm$^2$, a viscosity of less than 300cP, and which forms no toxic or flammable gases. The pumpable mixture is then fed into the mine cavity and, after separation of the heavier and lighter liquid phases, both phases are separately pumped out of the cavern.

U.S. Pat. No. 4,692,061 relates to a process for dumping particulate solid waste materials in an underground salt cavern containing rock salt solution and equipped with pipelines for filling and evacuating said cavern. The process generally comprises pumping out as much of the rock salt solution from the cavity as possible; rendering the particulate solids dust-free with a dust suppressant; introducing the dust-free particulate solids into the cavity until said cavity is two thirds to about three quarters ($\frac{3}{4}$) full; and, solidifying any water present in the dust suppressant together with any rock salt solution remaining in the cavity, and sealing the cavity.

U.S. Pat. No. 4,917,733 discloses a pozzolanic mixture for stabilizing landfill leachate which comprises fly ash with an excess of lime, kiln dust and optionally bottom ash, which is combined with water to produce a stable cementitious pozzolanic mixture that hardens to a mortar-like materials.

None of the prior art references encountered, however, disclose or suggest an acceptable method for the permanent storage of solid waste in an empty and/or mined salt cavity.

Salt mining activities in bedded salt deposits create a vast underground network of rooms excavated in dry, impervious salt which is encased above and below by virtually impermeable shales. Thus, these empty salt cavities are perhaps the most environmentally isolated places available for the storage of waste materials with permanent isolation from the biosphere.

Salt mines in bedded salt deposits have historically been mined using the room and pillar method wherein pillars of salt are left in place to hold up the mine roof. Alternatively, cribbing or more expensive fill materials are placed in critical mine areas to artificially support the roof. In some areas of weak rock in the roof and/or because of overmining, all mining activities were simply abandoned. Backfilling with a structurally supporting material made from industrial solid waste offers an entirely new area of salt mine stabilization that has not been previously considered. Additionally, this backfilling technique can also provide a partial solution for the todays solid waste disposal problem.

Accordingly, it is an object of the invention to provide a method and pozzolanic mixture which chemically converts to a strong, hard durable mass in a salt environment with favorable leaching and stability characteristics.

A further object is to provide a method of backfilling salt mines with a structurally supporting material said pozzolanic mixture.

Another objective is to provide an environmentally attractive alternative to surface landfills for the permanent reuse/disposal of selected solid waste materials.

SUMMARY OF THE INVENTION

The present invention generally relates to a method of backfilling empty mined salt cavities whereby many non-hazardous solid waste products can be combined, chemically and mechanically stabilized and beneficially employed to backfill mined cavity space in salt mines hundreds of feet below the earth's surface. In solid form the material will have an alkaline chemical makeup highly resistant to leaching of metallic ions present in the solids, and an immense buffering capacity against acidic water. The material will provide permanent solid backfill for mined salt cavities, reduce dead air volume, provide roof support, potentially increase minable reserves, and provide an environmentally attractive alternative for the permanent reuse/disposal of solid selected waste.

DETAILED DESCRIPTION OF THE INVENTION

The present invention relates to a method of backfilling mined salt cavities with a stabilized salt/ash cementitious slurry that hardens to a moderate strength cement. More particularly, the present invention relates to a method of hydraulically backfilling an empty mined salt cavity which comprises combining at least one pozzolanically active solid waste material, an alkaline earth metal hydroxide or hydratable alkaline earth metal oxide, and saturated brine to form a pozzolanic mixture, wherein the relative proportions of said pozzolanically active waste material, alkaline earth metal hydroxide and/or oxide and saturated brine are sufficient for reaction under atmospheric conditions in said salt cavity to form a stable, low porosity, load bearing pozzolanic cement, and depositing said pozzolanic mixture in said empty salt cavity.

The present invention further relates to a pozzolanic mixture for backfilling empty mined salt cavities which comprises at least one pozzolanically active waste material, at least one alkaline earth metal in the form of an alkaline earth metal hydroxide or hydratable alkaline earth metal oxide, and saturated brine, in the relative proportions effective for reaction under atmospheric conditions in said empty salt cavity to form a stable, low porosity, load bearing pozzolanic cement.

The term "pozzolanically active waste material" as employed herein means any solid waste material which, when combined with calcium hydroxide and/or calcium oxide and water at ordinary temperatures, forms compounds having cementitious properties. Pozzolanic materials are defined by the American Society for Testing Material (ASTM C 618) as "a siliceous or siliceous and aluminus material, which in itself possesses little or no cementitious value but will, in finely divided form and in the presence of moisture, chemically react with calcium hydroxide at ordinary temperatures to form compounds having cementitious properties". Examples of some pozzolanically active materials employable in the present invention include, but are not limited to, materials such as fly ash from coal burning plants, fly ash and bottom ash from municipal waste incinerators, including combined municipal waste combustion ash (MWC ash), ash from municipal sludge incinerators, smelter slags, cement kiln dust, lime kiln dust, and other similar non-hazardous solid wastes. It is preferred that the pozzolanic mixture of the present invention comprises from about 65 weight % to about 98 weight % pozzolanically active waste material (wt % dry solids). In another preferred embodiment, the pozzolanic mixture of the present invention comprises between about 70 weight % to about 95 weight % pozzolanically active waste material. Still more preferred, the pozzolanic mixture of the present invention comprises from about 85 weight % to about 95 weight % pozzolanically active waste material.

The term "fly ash" as used herein is intended to indicate the finely divided ash residue produced by the combustion of pulverized coal or lignite, which ash is carried with the gases exhausted from the furnace in which the coal is burned and which is collected from these gases usually by means of suitable precipitation apparatus such as electrical precipitators or fabric filters.

The properties that make fly ash attractive as a backfill material, apart from its abundance, is its natural pozzolanic properties, its ease in forming a hydraulic slurry, its hygroscopic nature, and its consequent strength to cost ratio. Fly ash obtained from coal burning furnaces which employ subbituminous and lignite coal from the western United States is a particularly attractive pozzolanically active waste material. Fly ash is alkaline and often contains free calcium oxide and/or hydroxide that will contribute to the presence of the required alkaline earth metal component of the present invention when employed therein. Other waste material(s) may also possess inherent pozzolanic activity and these materials can beneficially employed in the present invention. As an alternative, however, materials having pozzolanic activity, the equivalent amount being determined by ASTM test method C-311, entitled "STANDARD METHODS FOR SAMPLING AND TESTING FLY ASH OR NATURAL POZZOLANS FOR USE AS A MINERAL ADMIXTURE IN PORTLAND CEMENT CONCRETE", with specific reference to the subheading thereunder entitled, "Pozzolanic Activity Index-With Lime", can be substituted for fly ash. Thus, fine ash resulting from the combustion of oil and from the combustion of waste materials in large incinerators can be used interchangeably with fly ash. In a preferred embodiment, the pozzolanically active waste component comprises fly ash and municipal waste combustion ash.

Examples of "alkaline earth metal hydroxide or hydratable alkaline earth metal oxides" or sources thereof which are employable in the present invention include, but are not limited to Portland cement, high alumina cement, waste lime, lime kiln dust, partially calcined lime, cement kiln dust, high calcium dolomitic or magnesian quicklime or hydrated lime as described in ASTM C51 BOF and blast furnace waste dust, smelter slag. Preferred alkaline earth metal hydroxides or oxides comprise calcium, and/or have available reactive calcium hydroxide or calcium oxide.

Depending on the source of pozzolanically active waste material employed, the total amount of available, reactive alkaline earth metal oxide or alkaline earth metal hydroxide required for cementation might well be present in the waste material itself. An example is certain sources of fly ash, which may contain therein sufficient quantities of lime. If such is not the case, however, alkaline earth metal oxide or hydroxide must be added to the pozzolanic mixture to ensure that said mixture will form a mechanically and chemically stable, low porosity, load bearing solid once cementation is complete.

It is preferred that the pozzolanic mixture of the present invention contains at least about 0.5 weight percent of alkaline earth metal hydroxide and/or alkaline earth metal oxide or source thereof (wt % dry solids). In a more preferred embodiment, the pozzolanic mixture of the present invention comprises from about 2.0 weight % to about 10 weight % alkaline earth metal hydroxide or alkaline earth metal oxide, or mixtures thereof. Typically, from about 3 weight % to about 5 weight % based on the total solids content of the mixture will be sufficient.

The term "saturated brine" as employed herein shall mean water which is substantially saturated with soluble salts such as sodium chloride. A convenient source of saturated brine may be the waste brine stream produced from salt mining activities. Use of saturated brine in the present invention prevents the reaction of the pozzolanic mixture with the surrounding rock salt in the salt cavity thus preserving the integrity of the salt pillars, roof and floor. The saturated brine content of the pozzolanic mixture must be sufficient to provide enough water for the pozzolanic reaction to proceed, and to permit hydration of the dry mix. In general, a saturated brine content of 30% to 60% by weight (wt % total composition) will provide the desired degree of hydration. In a more preferred embodiment, the pozzolanic mixture comprises 35% to 45% by weight saturated brine.

The proportions of materials selected in each case are such so as to permit the pozzolanically active waste material and alkaline earth metal hydroxide or oxide to react at atmospheric conditions in the salt cavity, together with sufficient saturated brine, to facilitate the reaction and the formation of cementitious compounds, i.e., pozzolanic cement, therefrom. In many cases, a portion of the reactant material may be provided by the pozzolanically active waste material, such material commonly containing calcium hydroxide and/or calcium oxide or other alkaline components.

It is preferred that the waste materials employable in the present method be reduced to a uniform grain size of less than about 1.5 inch diameter. It is more preferred that said waste materials be reduced to a uniform grain of less than size 18 mesh. Still more preferred, said materials are reduced to a grain size of less than about 70 mesh. Grain size reduction can be achieved by any conventional method, including mechanical grinding.

The pH of the pozzolanic mixture of the present invention is preferably adjusted to a range of about 7 to 11, by the addition of small amounts of acid as required. A pH of between about 7 and 11 is the optimum range for metals immobility. Further, said material also has a significant buffering capacity against acidic water which might someday come into contact with the solidified backfill material.

The ratio of weight of saturated brine to weight of solids is a function of the specific materials being mixed, but generally it is within a brine to solids ratio of 0.55–0.75:1. When poured or deposited in an empty salt cavity and allowed to set, a pozzolanic reaction takes place that results in a cementitious solid mass that, when mixed in the optimum proportions of solid to liquid, absorbs virtually all of the liquid in hydration. The strength, density, and reactivity of this solid can be controlled by varying the proportions of the solid materials in the mix and by addition of variable amounts of lime or other calcium oxide material to enhance the pozzolanic reaction.

Another embodiment comprises pozzolanic mixture which comprises from about 40 wt % to about 69.5 wt % pozzolanically active waste material; from about 0.5 wt % to about 10 wt % alkaline earth metal hydroxide or alkaline earth metal oxide; and from about 30 wt % to about 50 wt % saturated brine.

In another embodiment, the present invention contemplates a pozzolanic mixture for backfilling empty mined salt cavities which comprises municipal waste combustion ash and/or fly ash; cement kiln dust, lime kiln dust and/or waste lime; and, saturated brine in relative proportions sufficient for reaction under atmospheric conditions in said salt cavity to form a stable, low porosity, load bearing pozzolanic cement.

In yet another embodiment, the present invention comprises a pozzolanic mixture of which comprises from about 43–57 wt % of a pozzolanically active waste material selected from the group consisting of municipal waste combustion ash, fly ash and mixtures thereof; from about 3.0–7.0 wt % of an alkaline earth metal hydroxide or alkaline earth metal oxide selected from the group consisting of hydrated lime, quicklime, Portland cement and mixtures thereof; and, form about 40–50 wt % saturated brine.

Another embodiment of the present invention contemplates a pozzolanic mixture for the backfilling of empty salt cavities which comprises 40–50 weight % MWC ash, 3.0–4.0 weight % hydrated lime, 3.0–5.0 weight % Portland cement and 40–50 weight % saturated brine.

The method and pozzolanic mixture of the invention presents several significant advantages over the prior art. Initially, when the pozzolanic mixture of the present invention is injected or otherwise deposited in an empty mined salt cavity, it is in a semi-fluid state and is able to conform to the shape of the irregular openings of the cavity and leave few air voids, which is necessary for effective backfilling. Large chunks of porous material would not be nearly as effective as a flowable slurry of cementitious material. More specifically, said chunks would be crushed by closure until it is compacted to a state in which it could support the weight of the overlying rock. This would result in surface subsidence which will be nearly equal to the volumetric closure underground. When, however, a mine is filled to the roof with the flowable, nonporous pozzolanic mixture of the present invention, said mixture conforms to all of the irregular shapes of the mine, which, upon curing, will retard and eventually stop closure, and subsequent subsidence.

Further, when the pozzolanic mixture of the present invention solidifies, it will have an alkaline chemical makeup highly resistant to leaching of metallic ions present in the solids, and will also have an immense buffering capacity against acidic water. The material will provide permanent solid backfill for the mined cavities, providing roof support, reduced dead air volume, improve safety and potentially increase mineable reserves. Use of saturated brine in the present invention also prevents any reaction between the pozzolanic mixture/pozzolanic cement and the rock salt of the mine, thus preserving the integrity of same.

Waste elimination is another benefit of the present invention. Waste salt fines and salt water or brine wastes from the salt mine can be effectively recycled into the slurry process, thus reducing the mine's own waste products. Finally, the present invention provides an attractive alternative for the storage of solid waste materials, such as municipal waste combustion ash, which will be permanently isolated from the biosphere.

I claim:

1. A method of hydraulically backfilling an empty mined salt cavity which comprises combining at least one pozzolanically active waste material with a uniform grain size reduced to less than about 65 mesh, with an effective amount of a cementing agent which comprises an alkaline earth metal hydroxide or alkaline earth metal oxide and brine to form a pozzolanic mixture, wherein the reactive proportions of said pozzolanically active waste material, cementing agent, and brine are sufficient for reaction under atmospheric conditions in said salt cavity to form a stable, low porosity, load bearing pozzolanic cement, with the proviso that said pozzolanic mixture does not contain a setting-retarder; and hydraulically depositing said pozzolanic mixture in the empty salt cavity.

2. The method of claim 1 wherein the pH of said pozzolanic mixture to between about 7 to about 11.

3. The method of claim 1 wherein said pozzolanically active waste material is selected from the group consisting of municipal waste combustion ash, fly ash, bottom ash, smelter slags, cement kiln dusty, lime kiln dust, municipal sludge ash and mixtures thereof.

4. The method of claim 1 wherein said cementing agent is selected from the group consisting of Portland cement, high alumina cement, lime, lime kiln dust, cement kiln dust, partially calcined lime, blast furnace or BOF waste dust, calcium oxide, calcium hydroxide, pulverized limestone and mixtures thereof.

5. The method of claim 1 wherein the uniform particle size of said pozzolanically active waste material is less than about 70 mesh.

6. The method of claim 1 wherein said pozzolanic mixture comprises from about 40 wt % to about 69.5 wt % pozzolanically active waste materials; from about 0.5 wt % to about 10 wt % cementing agent; and from about 30 wt % to about 50 wt % saturated brine.

7. The method of claim 6 wherein said pozzolanically active waste material is selected from the group consisting of municipal waste combustion ash, fly ash and mixtures thereof, and said cementing agent is selected from the group consisting of calcium oxide, calcium hydroxide and mixtures thereof.

8. The method of claim 6 wherein said pozzolanically active mixture comprises about 50 wt % to about 62 wt % pozzolanically active waste material; from about 3 wt % to about 5 wt % cementing agent; and from about 35 wt % to about 45 wt % saturated brine.

9. A pozzolanic mixture for backfilling empty salt cavities which comprises at least one pozzolanically active waste material with a uniform grain size reduced to less than about 65 mesh, an effective amount of a cementing agent which comprises an alkaline earth metal in the form of an alkaline earth metal hydroxide or a hydratable alkaline earth metal oxide and brine, in relative proportions sufficient for reaction under atmospheric conditions in said salt cavity to form a stable, low porosity, load bearing pozzolanic cement with the proviso that said pozzolanic mixture does not contain a setting-retarder.

10. The pozzolanic mixture of claim 9 wherein the pH is in a range of between about 7 and about 11.

11. The pozzolanic mixture of claim 9 wherein the pozzolanically active waste material is selected from the group consisting of municipal waste combustion ash, fly ash, bottom ash, smetler slags, cement kiln dust, lime kiln dust, municipal sludge ash, and mixtures thereof.

12. The pozzolanic mixture of claim 9 wherein said cementing agent is selected from the group consisting of Portland cement, high alumina cement, lime, lime kiln dust, cement kiln dust, partially calcined lime, blast furnace or BOF waste dust, calcium oxide, calcium hydroxide, pulverized limestone and mixtures thereof.

13. The pozzolanic mixture of claim 9 wherein the particle size of said waste materials is less than about minus 70 mesh.

14. The pozzolanic mixture of claim 9 which comprises from about 40 wt % to about 69.5 wt % pozzolanically active waste material; from about 0.5 wt % to about 10 wt % cementing agent; and from about 30 wt % to about 50 wt % saturated brine.

15. The pozzolanic mixture of claim 14 wherein said pozzolanically active waste material is selected from the group consisting of municipal waste combustion ash, fly ash and mixtures thereof, and said cementing agent is selected from the group consisting of calcium oxide, calcium hydroxide and mixtures thereof.

16. The pozzolanic mixture of claim 14 which comprises from about 50 wt % to about 62 wt % pozzolanically active waste material, from about 3 wt % to about 5 wt % cementing agent; and from about 35 wt % to about 45 wt % saturated brine.

17. A pozzolanic mixture for backfilling empty salt cavities which comprises a pozzolanically active waste material with a uniform grain size reduced to less than about 65 mesh selected from the group consisting of municipal waste combustion ash, fly ash and mixtures thereof; a cementing agent which comprises an alkaline earth metal hydroxide or alkaline earth metal oxide selected from the group consisting of hydrated lime, quicklime, Portland cement and mixtures thereof, and brine in relative proportions sufficient for reaction under atmospheric conditions in said salt cavity to form a stable, low porosity, load bearing pozzolanic cement with the proviso that said pozzolanic mixture does not contain a setting-retarder.

18. The pozzolanic mixture of claim 17 which comprises from bout 43–57 wt % of a pozzolanically active waste material selected from the group consisting of municipal waste combustion ash, fly ash and mixtures thereof; from about 3.0–7.0 wt % of a cementing agent selected from the group consisting of hydrated lime, quicklime, Portland cement and mixtures thereof; and, from about 40–50 wt % brine.

* * * * *